United States Patent [19]

Sasayama

[11] 3,912,372

[45] Oct. 14, 1975

[54] PHOTOELECTRIC DETECTOR DEVICE

[75] Inventor: Shinya Sasayama, Kawasaki, Japan

[73] Assignee: Nippon Kogaku K.K., Tokyo, Japan

[22] Filed: Apr. 30, 1974

[21] Appl. No.: 465,572

[30] Foreign Application Priority Data

May 10, 1973 Japan .............................. 48-51185

[52] U.S. Cl. ................ 356/170; 250/561; 356/163; 356/167; 356/172

[51] Int. Cl.[2] .......................................... G02B 27/00

[58] Field of Search ........... 356/152, 163, 167, 170, 356/172; 250/561

[56] References Cited

UNITED STATES PATENTS

| | | | |
|---|---|---|---|
| 3,540,831 | 11/1970 | Lovering | 356/170 |
| 3,560,097 | 2/1971 | Gavrilkin et al. | 356/172 |
| 3,565,532 | 2/1971 | Heitmann et al. | 356/170 |
| 3,770,353 | 11/1973 | Brown et al. | 250/552 |

*Primary Examiner*—Ronald L. Wibert
*Assistant Examiner*—Richard A. Rosenberger
*Attorney, Agent, or Firm*—Fitzpatrick, Cella, Harper & Scinto

[57] ABSTRACT

A photoelectric detector device for determining whether or not a body formed with a linear mark lies within a given range comprises an image-forming optical system for forming the image of the linear mark, two slit plates disposed adjacent the focal plane of the optical system and a corresponding number of photoelectric converter means for converting into electrical signals light beams passed through the slits in the plates. The slits each formed in the plates are parallel to the linear mark and correspond in position to the opposite ends of the range. Oscillating means are provided for causing the image-forming light beam passing through the optical system and the plates to be oscillated relative to each other at a predetermined frequency so as to scan the image of the linear mark within a range containing at least the slits. A processing circuit for taking the difference between the output signals from the two photoelectric converters derives from such difference signal a frequency component equal to the oscillation frequency of the oscillating means, thus providing either a positive or a negative signal indicating the position of the linear mark.

7 Claims, 8 Drawing Figures

PHOTOELECTRIC DETECTOR DEVICE

BACKGROUND OF THE INVENTION

1. Field of the Invention

This invention relates to a photoelectric detector device for determining whether or not a body formed with a linear mark is positioned within a certain range.

2. Description of the Prior Art

It is known to employ photoelectric microscopes for determining the position of a stationary body. As will later be discussed, photoelectric microscopes, known to me, suffer from the disadvantage, when used for the purpose mentioned, that accurate detection or determination of the position of a mark or body is not possible when displacement is in the vicinity of zero, the displacement output characteristics being variable under the influence of such factors as width of the mark, scanning amplitude, illumination brightness, etc.

SUMMARY OF THE INVENTION

I contribute by the present invention a photoelectric detection device which is capable of determining whether or not the position of a body is within a certain set range.

According to an embodiment of the present invention, the photoelectric detector device for determining whether or not a body formed with a linear mark lies within a predetermined set range comprises an image-forming optical system for forming an image of the linear mark. A plate formed with a slit is disposed adjacent the plane in which the image of the linear mark is formed by the optical system. The slit is positioned to correspond to one end of the set range and is parallel to the linear mark. A second plate formed with a slit is disposed adjacent said plane. The second slit is positioned to correspond to the other end of the set range and is parallel to the linear mark. A first photoelectric converter means is provided for converting into an electrical signal a light signal passed through the slit in the first plate, and a second photoelectric converter means is provided for converting into an electrical signal a light signal passed through the slit in the second plate. Oscillating means are provided for causing the image-forming light beam passing through the optical system and the first and second slit plates to be oscillated relative to each other at a predetermined frequency so as to scan the image of the linear mark within a range containing at least the slit portions of the first and second plates. A processing circuit is provided for taking the difference between the output signals from the first and second photoelectric converter means and deriving from the difference a frequency component equal to the oscillation frequency of the oscillating means, thereby providing either a positive or a negative signal when the image of the linear mark lies within the set range, and providing either a negative or a positive signal when the image lies outside the set range.

According to another embodiment of the present invention, a single slit plate may be employed instead of the two slit plates. The single slit plate has a slit formed at a location thereof corresponding to one end of the set range and parallel to the linear mark and has a linear opaque portion formed at a location thereof corresponding to the other end of the set range and parallel to the linear mark. The remainder of the slit plate is translucent. In this case, the image-forming light passing through the optical system and the single slit plate are oscillated relative to each other at a predetermined frequency so as to scan the image of the linear mark within a range containing at least the slit and linear opaque portion of the slit plate. Also, a single photoelectric converter means may be employed instead of the two photoelectric converter means. A synchronous rectifier circuit is provided for deriving from the output signal of the single photoelectric converter means a frequency component equal to the oscillation frequency of the oscillating means, thereby providing either a positive or a negative signal and either a negative or a positive signal in the same manner as described in respect of the first embodiment.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIGS. 4(*a*) and 4(*b*) are graphs illustrating the displacement-output characteristic of the embodiment of the present invention;

DESCRIPTION OF THE PREFERRED EMBODIMENTS

Figures 1, 2, 4A, 4B:
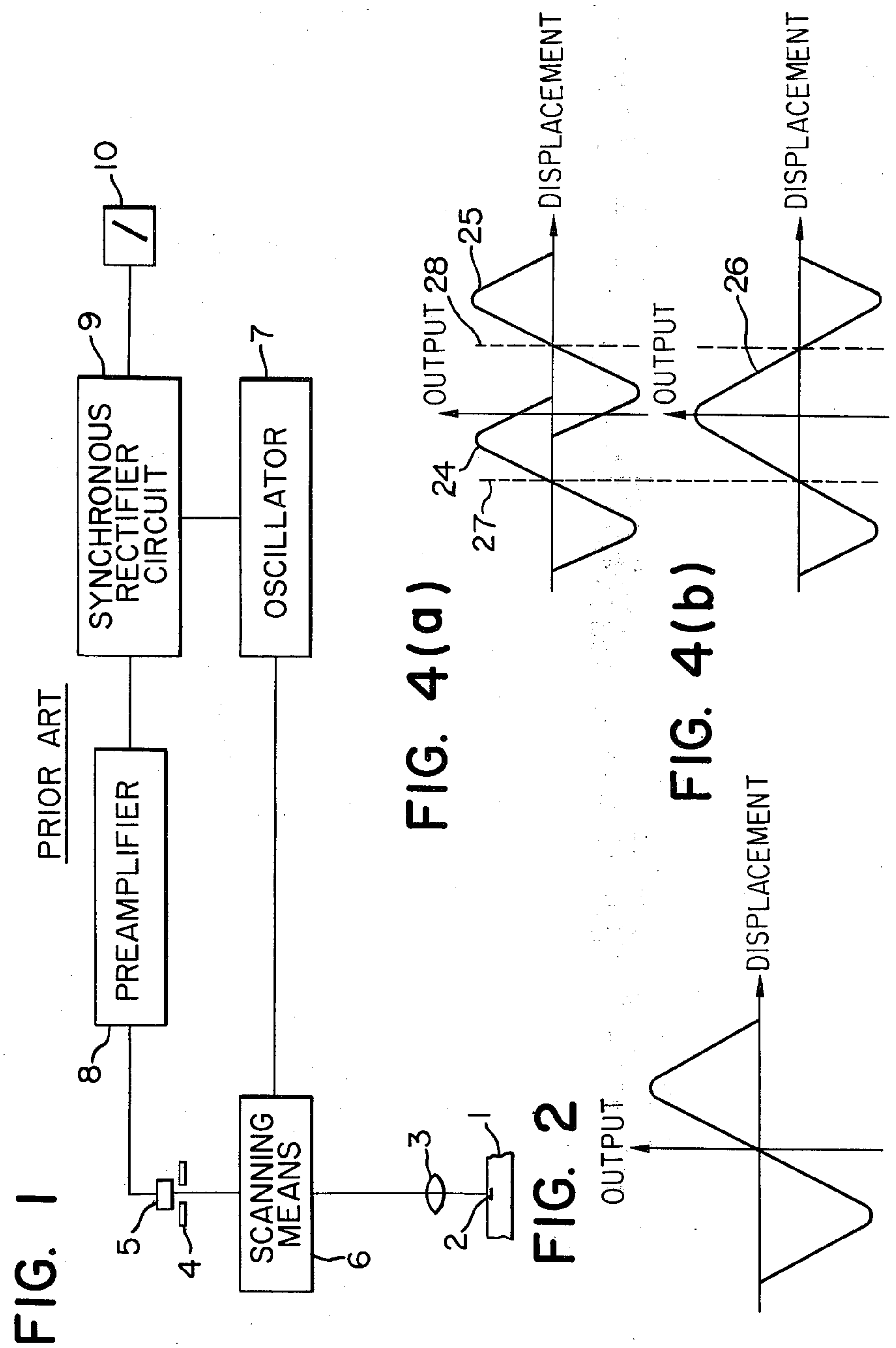
FIG. 1 is a diagrammatic representation of a photoelectric microscope according to the prior art.
FIG. 2 is a graph illustrating the displacement-output characteristic of the photoelectric microscope shown in FIG. 1.

According to the prior art as illustrated in FIG. 1, a body 1 to be detected is formed with a linear mark 2, the image of which may be focused on a slit 4 by an objective lens 3 and the image-carrier light is received by a photoelectric converter 5 disposed behind the slit 4. Disposed forwardly of the slit 4 is a scanning means 6 driven by an oscillator 7. The scanning means 6 may be oscillated in a sine form and scan the image of the mark 2 perpendicularly to the slit 4 or perpendicularly to the light beam. The scanning means 6 may be realized by utilizing an alternating field to rotate and oscillate a glass plate about its own axis.

Thus, the output of the photoelectric converter 5 is a signal modulated at a frequency equal to the scanning frequency of the scanning means 6. Such output signal may be amplified by a preamplifier 8, and then synchronously rectified by a synchronous rectifier circuit 9 at a frequency equal to the scanning frequency. That is, the synchronous rectifier takes a frequency component equal to the scanning frequency out of the output signal from the preamplifier 8.

FIG. 2 shows the relationship between the position (displacement) of the image of the mark relative to the center of oscillation for the slit scanning and the output of the synchronous rectifier circuit. In this FIG., the abscissa represents the displacement and the ordinate represents the output of the synchronous rectifier circuit. When the displacement is zero, the output is also zero. In the vicinity of a small displacement, the output is substantially proportional to the displacement so that the position of the mark can be detected by using a meter 10 to read the position where the output is zero. In this way, the photoelectric microscope enables accurate detection of the position of the mark for zero displacement, whereas, as already stated, it cannot ensure accurate detection of the position of the mark for displacement in the vicinity of zero when the displacement-output characteristic is variable under the influence of such factors as width of the mark, scanning amplitude, brightness of the illumination, etc.

Figure 3:
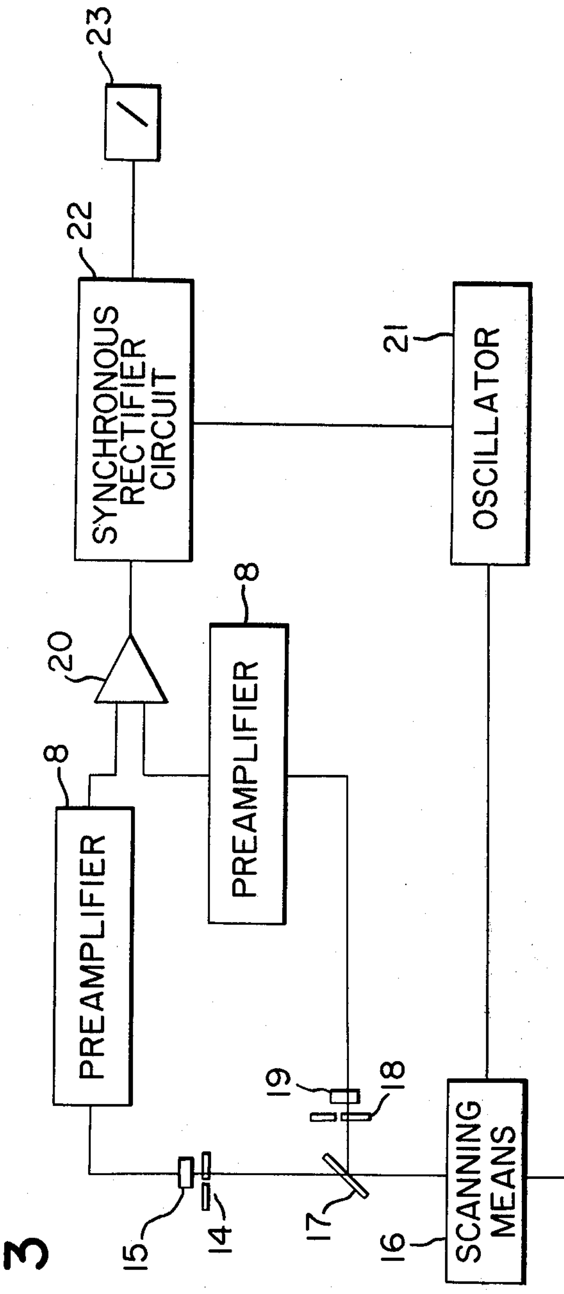
FIG. 3 is a diagrammatic representation of a first embodiment of the present invention.

Referring now to FIG. 3, there is shown a first embodiment of the present invention wherein a body 11 to be detected has a linear mark 12 formed on one surface thereof. The linear mark 12 is focused through a lens 13 and a half-mirror 17 onto a first slit plate 14 and a second slit plate 18, respectively. The first slit plate 14 is formed with a slit parallel to the linear mark 12 and at a location corresponding to one end of the set range which is off the optical axis of the lens 13. On the other hand, the second slit plate 18 is formed with a slit parallel to the linear mark 12 and at a location corresponding to the other end of the set range which is off the optical axis of the lens 13. A scanning means, designated by reference numeral 16, may be oscillated in a sine form and scan the image of the mark 12 perpendicularly to the first and second slits 14 and 18, and is constructed in the manner as shown in FIG. 5.

Figure 5:
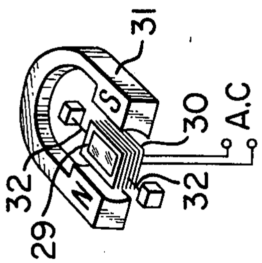
FIG. 5 is a perspective view illustrating a specific form of the scanning means.

Referring to FIG. 5, a glass member 29 having a coil 30 wound thereabout is disposed in the field of a magnet 31 and supported for oscillation by a steel wire 32. Supply of an AC sine-wave current from an oscillator 21 to the coil 30 causes the glass member 29 to be oscillated in a sine form about the steel wire 32. Such sine-form oscillation of the glass member may be utilized to oscillatorily scan the image of the mark 12 in a sine fashion and perpendicularly to the slits in the first and second slit plates 14 and 18, respectively.

As is shown in FIG. 3, photoelectric converters 15 and 19 are provided for receiving light beams passed through the slits in the first and second slit plates 14 and 18 to convert such light beams into electrical signals. A differential amplifier 20 is connected to receive the output signals from the photoelectric converters 15 and 19 through respective preamplifiers 8 to take the difference between the two output signals. A synchronous rectifier circuit 22 is connected to take a frequency component equal to the scanning frequency of the scanning means 16 out of the output signal from the differential amplifier 20, in accordance with the signal from an oscillator 21, and the output of the synchronous rectifier circuit is connected to an indicating meter 23.

Operation of the first embodiment of the present invention as shown in FIG. 3 will now be described.

What has been described above in connection with FIG. 2 is applicable in considering the relationship between the output voltage of the synchronous rectifier circuit and the displacement of the body when the output of one photoelectric converter is synchronously rectified.

In FIG. 3, the case where the signals from the photoelectric converters 15 and 19 are individually synchronously rectified will be considered. The displacement-output characteristics then provided will be such as shown by curves 24 and 25, respectively, in FIG. 4(*a*). The dashed lines in this FIG. respectively correspond to the set positions of the slits in the first and second plates 14 and 18 with respect to the optical axis. Thus, in FIG. 3, if the difference between the output signals from the photo-electric converters 15 and 19 is taken and synchronously rectified, the displacement-output characteristic of such difference will be the curve 24 of FIG. 4(*a*) minus the curve 25 of FIG. 4(*a*). The result is shown in FIG. 4(*b*). In this FIG., it is seen that the output of the synchronous rectifier circuit 22 is zero in the set positions 27 and 28 of the slits and is positive and negative inside and outside the set positions respectively. Therefore, the positive or negative value of output indicated by the meter 23 determines whether or not the body to be detected lies within the set range.

Figure 6:
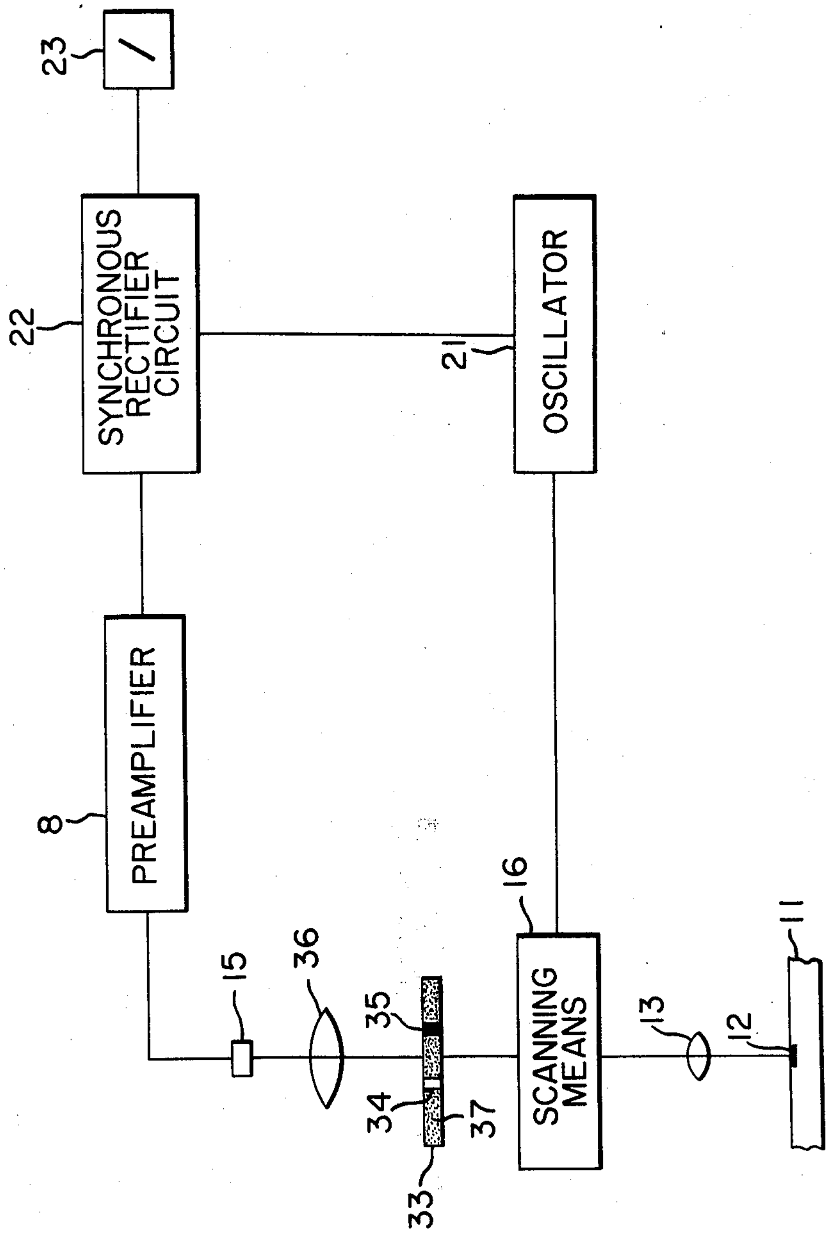
FIG. 6 illustrates diagrammatically a second embodiment of the present invention.

FIG. 6 shows a second embodiment of the present invention wherein reference numerals similar to those in FIG. 3 designate similar elements. Here, a slit plate 33, a condenser lens 36, a photoelectric converter 15 and a preamplifier 8 respectively replace the half-mirror 17, the first and second slit plates 14 and 18, the photoelectric converters 15 and 19, the preamplifiers 8 and the differential amplifier 20 in the first embodiment.

Figure 7:
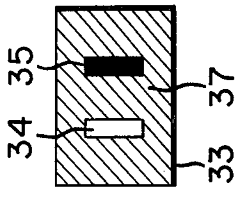
FIG. 7 is a sectional view of the slit plate used in the second embodiment.

The slit plate 33, as is shown in FIG. 7, comprises a slit portion 34 for fully passing light therethrough, a light-intercepting portion 35 for fully intercepting light, and a translucent portion 37 for half-passing light. The condenser lens 36 is such that all light passed through the slit in plate 33 is passed through the condenser lens 36 to the photoelectric converter 15, which converts the light into an electrical signal.

In the FIG.3 embodiment, the difference between the outputs of the two photoelectric converters has been taken and transmitted to the subsequent stage thereby to provide such displacement-output characteristic as shown in FIG. 4(*b*). However, if the slit plate as shown in FIG. 7 is employed, the output of the photoelectric converter 15 when the slit portion 34 of the plate 33 is being scanned and the output of the photoelectric converter 15 when the light-intercepting portion 35 of the slit plate is being scanned are in the opposite characteristic relations and therefore, the sum of these two outputs may provide the displacement-output characteristic as shown in FIG. 4(*b*). Thus, whether or not the linear mark 12 in the body 11 to be detected lies within a certain range can be known in the same manner as that described with respect to the first embodiment.

The foregoing embodiments have been described as using a scanning means for oscillating the light beam relative to the slit or slits but it will be apparent that the same result may be achieved by using a scanning means for oscillating the slit or slits relative to the light beam.

Thus, the present invention can readily detect whether or not a body lies within a certain set range and this is useful in the fields of measurement, examination and so forth.

I believe that the construction and operation of my novel photoelectric detector device will now be understood and that its advantages will be fully appreciated by those persons skilled in the art.

I claim:

1. A photoelectric detector device for determining whether or not a body formed with a linear mark lies within a predetermined set range, comprising;

1. an image-forming optical system for forming an image of the linear mark in two different planes, respectively;
2. a first plate formed with a first slit and disposed adjacent one of said two different planes, said first slit positioned at a location corresponding to one end of the set range and parallel to said linear mark;
3. a second plate formed with a second slit and disposed adjacent the other of said two planes, said second slit positioned at a location corresponding to the other end of said set range and parallel to said linear mark;
4. first photoelectric converter means for converting into an electrical signal a light signal passed through said first slit in said first plate,
5. a second photoelectric converter means for converting into an electrical signal a light signal passed through said second slit in said second plate;
6. oscillating means for causing the image-forming light beam passing through said optical system and said first and second plates to be oscillated relative to each other at a predetermined frequency so as to scan the image of said mark within a range containing at least the slit portions of said first and second plates; and
7. a processing circuit for taking the difference between the output signals from said first and second photoelectric converter means and deriving from said difference signal a frequency component equal to the oscillation frequency of said oscillating means, thereby providing either a positive or a negative signal when the image of said mark lies within said range and providing either a negative or a positive signal when said image lies outside said range.

2. A photoelectric detector device according to claim 1, in which said image-forming optical system comprises, a lens for forming an image of said linear mark and a half-mirror disposed in the optical path of said lens for dividing said optical path into two optical paths, said first plate being disposed in one of the two optical paths and said second plate being disposed in the other of the two optical paths.

3. A photoelectric detector device according to claim 2, wherein said oscillating means causes the image-forming light beam prior to its incidence on said half-mirror to be oscillated at a predetermined frequency.

4. A photoelectric detector device according to claim 1, wherein said oscillating means is adapted to cause the image-forming light beam passing through said optical system to be oscillated at a predetermined frequency.

5. A photoelectric detector device according to claim 1, wherein said processing circuit includes:

a. a differential amplifier circuit for deriving the difference between the output signals from said first and second photoelectric converter means; and b. a synchronous rectifier circuit for deriving from the output signal of said differential amplifier circuit a frequency component equal to the oscillation frequency of said oscillating means.

6. A photoelectric detector device according to claim 5, further comprising means connected to said synchronous rectifier circuit for providing an indication corresponding to either said positive or said negative signal.

7. A photoelectric detector device according to claim 1, further comprising means connected to said processing circuit for providing an indication corresponding to either said positive or said negative signal.

* * * * *